United States Patent [19]
Gilbert

[11] Patent Number: 5,407,396
[45] Date of Patent: Apr. 18, 1995

[54] CHAIN SHIFTER

[76] Inventor: Raymond D. Gilbert, 6501 Inwood Dr., Springfield, Va. 22150

[21] Appl. No.: 181,294

[22] Filed: Jan. 13, 1994

[51] Int. Cl.⁶ .............................................. F16H 59/00
[52] U.S. Cl. .................................................... 474/80
[58] Field of Search ...................................... 474/78–82

[56] References Cited

U.S. PATENT DOCUMENTS

| | | | |
|---|---|---|---|
| 4,693,700 | 9/1987 | Chappell | 474/80 |
| 5,102,372 | 4/1992 | Patterson et al. | 474/80 |
| 5,163,881 | 11/1992 | Chattin | 474/80 X |
| 5,197,927 | 3/1993 | Patterson et al. | 474/80 |

*Primary Examiner*—Michael Powell Buiz
*Attorney, Agent, or Firm*—Raymond D. Gilbert

[57] ABSTRACT

A pedal-force chain-shifting apparatus senses a rider's peak force within each half revolution of a pedal set. A shift-down pedal pressure is set to match a rider's weight, strength and stamina objectives. A displacement mechanism compares the peak force with the pressure setting, and uses a portion of chain energy to actuate derailleur chain-shifting mechanisms to guide chain onto larger rear wheel sprocket size. A digital force-averaging mechanism measures a series of less than full pressure cycles to sense a cycle in which a portion of chain energy pulses the derailleur to shift-up by guiding the chain onto a smaller sprocket. This apparatus replaces need for a bicycle rider to anticipate and select appropriate sprockets at front and rear derailleur apparatus.

20 Claims, 6 Drawing Sheets

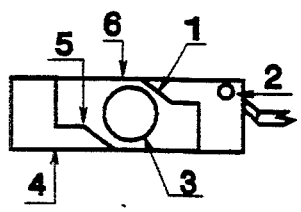
Fig 10.
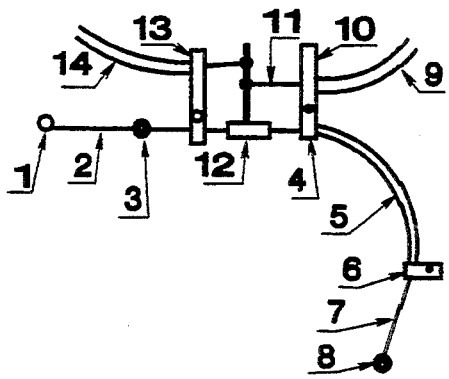
Fig 9.
Fig 11.
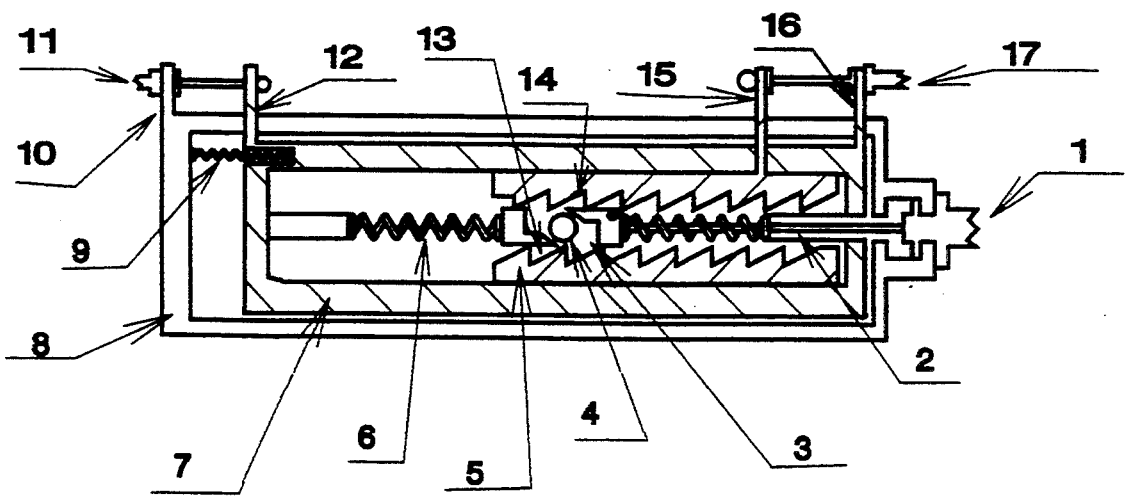
Fig 12.
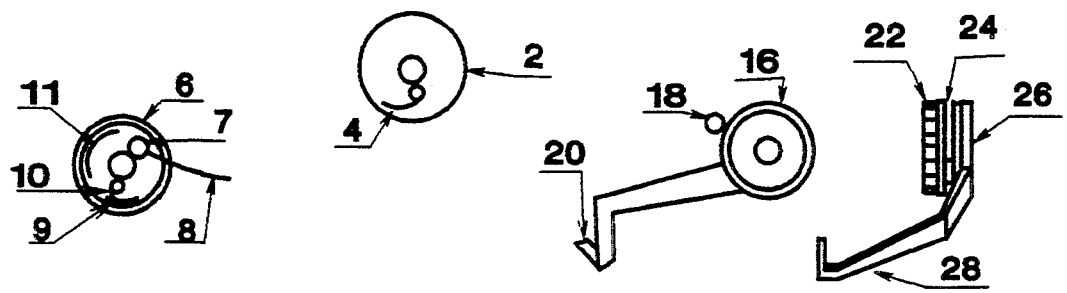

CHAIN SHIFTER

BACKGROUND OF THE INVENTION

The rider-problem of a multi-sprocket bicycle is that the rider needs to manage chain-shifting apparatus that is not visible in the riding position. Safe and satisfactory riding involves shifting a chain to an appropriate set of sprockets in anticipation of speed change, terrain differences and future startup.

Derailleur mechanisms are mounted to guide chain travel onto front and rear sprocket sets, as specified by cable-command from non-standard hand-operated apparatus. Misjudgment in guiding the chain onto appropriately-sized sprockets is initially irritating; and sustained erroneous operation can induce knee injury.

Modern bicycles offer 7 to 21 chain-and-sprocket ratios. When pedalling seems too stiff, or too soft, the rider is expected to make sprocket-ratio adjustments. Cable adjusting apparatus is mounted within rider's vision on handlebars or bicycle frame.

Prior art for an automatic bicycle transmission (U.S. Pat. No. 4,598,920) sensed the angular velocity of the rear bicycle wheel, and guided the chain onto a smaller driven sprocket as angular velocity increased. This velocity-sensing system is independent of rider's variation in pedal-drive pressure.

SUMMARY OF THE INVENTION

A person-driven vehicle chain is drawn from a back wheel sprocket to a pedal sprocket through a tension measuring apparatus. The chain path is curved around a movable idler sprocket attached to an adjustable biasing member. Peak chain tension within each half-revolution of a driven pedal reacts against the bias to provide cyclic motion of the idler-wheel shaft position against its desired level of bias. Chain-shifter apparatus convert this force and motion into push pulses and pull pulses.

A pulse-to-distance converter apparatus accepts push and pull pulses, and delivers a push or pull cumulative length through a derailleur cable. The derailleur guides a chain onto appropriate sprockets within a driving or driven sprocket set.

When pedal forces displace an idler sprocket shaft beyond a spring-set threshold, the apparatus converts a portion of the displacement energy to "push" the derailleur cable. When pedal forces displace the shaft beyond a lower threshold and not above the upper threshold consistently, the apparatus converts a portion of the displacement energy to "pull" the derailleur cable.

A shift-down chain guide is mounted between the wheel sprocket set and the chain shifter. This guide uses reversed pedal travel to lift the chain onto a large rear sprocket, and to pulse the converter and its derailleur cable sufficiently to align the chain guide to a start up location.

A pedal-force setting apparatus adjusts the biasing thresholds to initiate shift-up or shift-down processes. This feedback system eliminates or reduces a rider's need to define chain sprocket settings. Thumb-driven buttons can temporarily override the automatic shift processes.

This method for pre-setting pedal-force limits can minimize a rider's risk of physiological knee damage.

DETAILED DESCRIPTION

Figure 1:
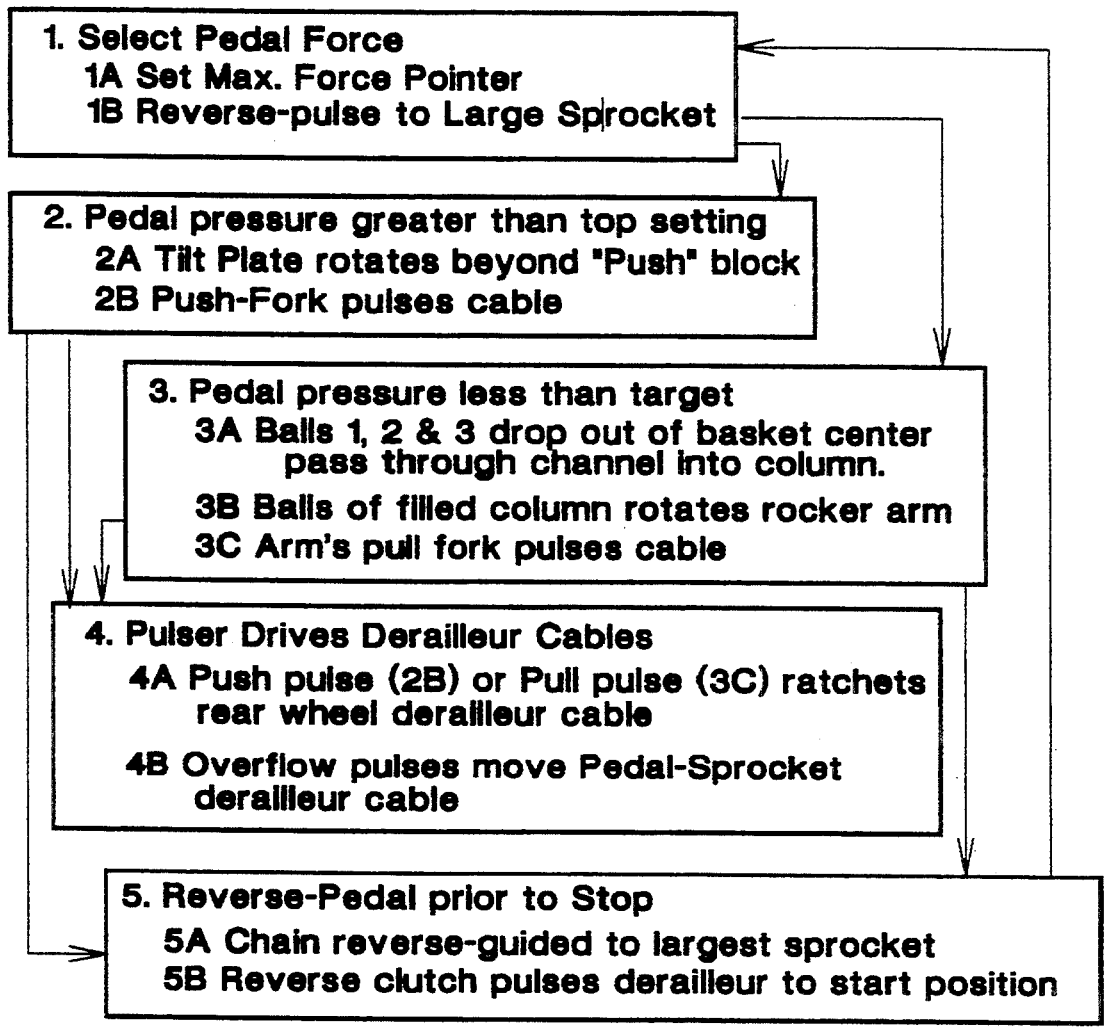
FIG. 1. Method for chain-shifting
FIG. 2. Bike with auto-shifter on rear fork
FIG. 3. Shifter with chain route
FIG. 4. Base plate with pulsers, bearing, spring and ball channels
FIG. 5. Tilt plate with chain idlers & force adjuster
FIG. 6. Ball core with column and holder
FIG. 7. Channels, with bearing location
FIG. 8. Tilt-sequence to actuate pulsers
FIG. 9. Pulse cable
FIG. 10. Pulse ball carrier
FIG. 11. Pulse converter
FIG. 12. Chain positioner
FIG. 13. Slitted column
FIG. 14. Thumb pulser
FIG. 15. Pulse generator w fluids
FIG. 16. Electro-mechanical pulse generator
FIG. 17. Resistive chain-tension sensor
FIG. 18. Chained-sprocket sensor
FIG. 19. Shifting Circuit
FIG. 20. Pedal sprocket sensor
Figure 2:
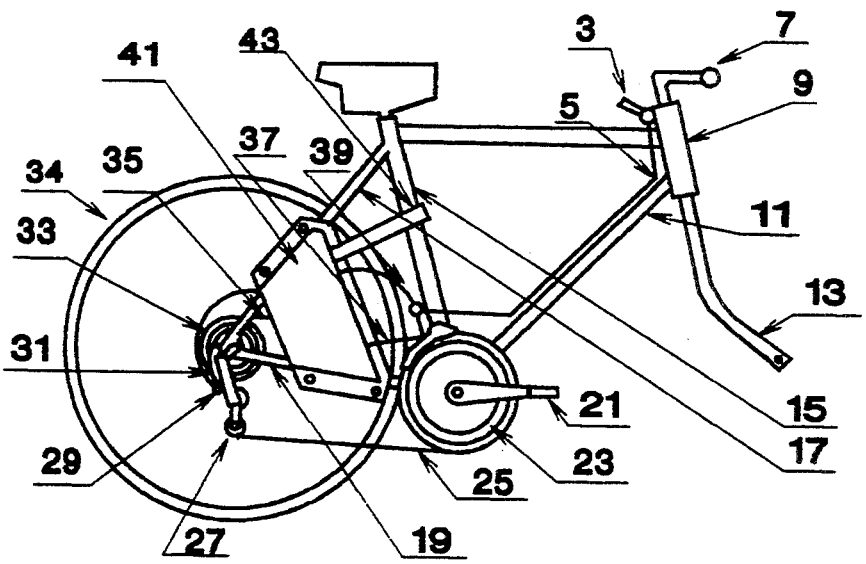
Figure 3:
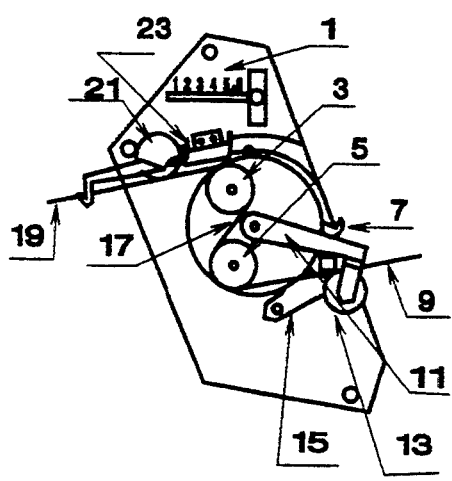

An autoshifter method for chain-shifting (FIG. 1) permits a rider to select a maximum pedal force (FIG. 1-1). When pedal is pressed at force greater than setting, a pulse cable is pushed (FIG. 1-2B). When pedal pressure is consistently less than proportionally lower force, the pulse cable is pulled (FIG. 1-3C). Pulses are converted (FIG. 1-4A) to derailleur cable travel, and resultant chain-to-sprocket changes.

Reversing pedal travel (FIG. 1-5) guides chain to desired starting sprockets without using hand-shifting apparatus.

A vehicle chain-shifter (FIG. 2-41) is fitted between the bottom rear fork (FIG. 2-19) and top rear fork (FIG. 2-35) on the chain side of a bicycle having rear wheel derailleur (FIG. 2-27) and sprocket derailleur (FIG. 2-39).

(A derailleur is a mechanism on a bicycle for controlling its speed by shifting the sprocket chain from one to another of a set of different-sized sprocket wheels. Websters Dict.)

Figure 4:
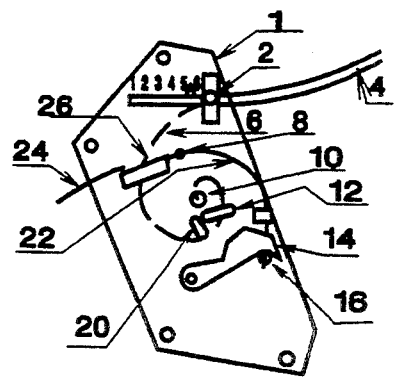
Figure 5:
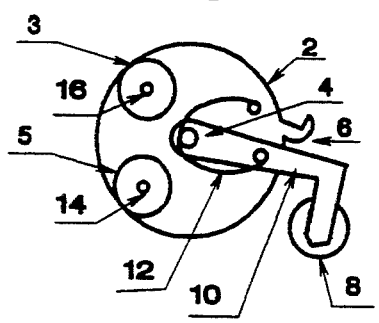
Figure 6:
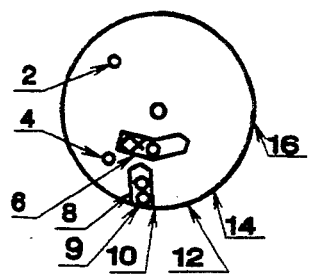
Figure 7:
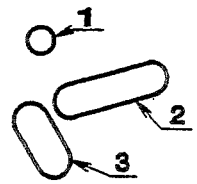
Figure 7:
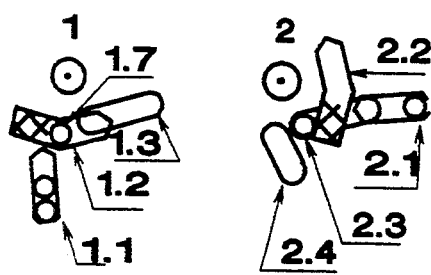

A tension setter (FIG. 2-43) adjusts the tension of a spring (FIG. 4-6) located on the back side of a base plate (FIG. 4). The spring is connected at its rotating end to a shaft (FIG. 5-4) that passes through a bearing (FIGS. 4-10 & 7-1) into a tilt plate (FIG. 5-2).

A first sprocket wheel (FIGS. 3-3 & 5-3) on the tilt plate (FIG. 5), in combination with a second sprocket wheel (FIGS. 3-5 & 5-5) becomes a couple to collect energy from a tension-loaded chain (FIG. 3-9).

A push-fork (FIGS. 3-7 & 5-6) on the tilt plate pushes a cable-block (FIG. 4-8 & 9-3) when the couple-force exceeds the set spring force.

The baseplate holds a pulser (FIGS. 4-26 & 11), a pulse cable (FIGS. 4-22 & 9), a bearing, a first static ball channel (FIGS. 4-12, 7-2 & 8-4.3) and a second static ball channel (FIGS. 4-20, 7-3 & 8-2.4).

Figure 8:
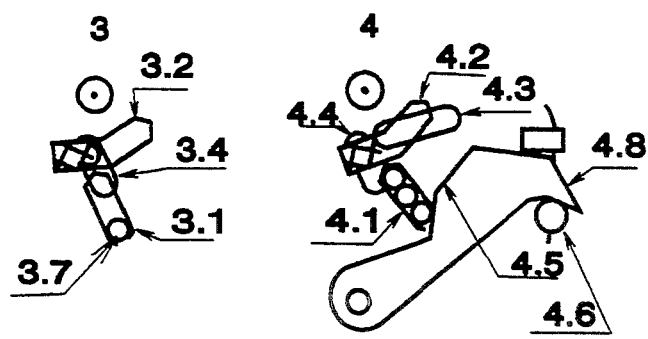

Shafts from the couple (FIGS. 5-14 & 5-16) pass through the tilt plate into a ball core (FIGS. 6-2 & 6-4), and rotate the ball core through four tilt positions. (FIGS. 6-10, 12, 14 & 16):

Position 1 at 6-10 is at the base of a ball column (FIGS. 6-8 & 13-9) while the chain has no tension.
Balls (FIG. 8-1.7), temporarily stored in a first base plate channel (FIG. 8-1.3) will flow into a core basket (FIG. 8-1.2).

Position 2 at 6-16 is maximum rotational travel while couple tension exceeds spring-set counter tension. The ball core (FIG. 6) position is shared by shafts, common with the tilt plate. At this rotated position, the push fork has moved the cable block one pulse-distance, and the angle of the ball column will let a ball roll into the first channel.

Position 3, at 6-12, is the location of the ball column where an exit from a core basket (FIG. 6-6) communicates with an entrance to a second channel. A ball, temporarily in the core basket, may pass from the basket, through the second channel, and into the top side entrance (FIG. 13-11) of the ball column (FIG. 13-9).

Position 4 at 6-14 is an intersection of balls in a filled, ball-column (FIGS. 8-4.1 & 13-12) whose bottom is slitted (FIG. 13-10) to allow a cam (FIG. 4-14) surface (FIG. 8-4.5) to contact balls within the column. When the slitted column is filled with balls, the pull cam is rotated downward to execute a "pull pulse" through a pulse-cable (FIGS. 8-4.6 & 9-7).

The pulse cable (FIG. 9-2 & 7) is moved forward and backward through guides (FIG. 9-5) in response to pulse movements on push-block (FIG. 9-3) and on pull block (FIG. 9-8 & 4-16). A pulse converter (FIG. 11) oscillates a ball and carrier (FIG. 10) within a ratchet piece (FIG. 11-5) through distances equal to a push pulse plus a pull pulse.

Figure 13:
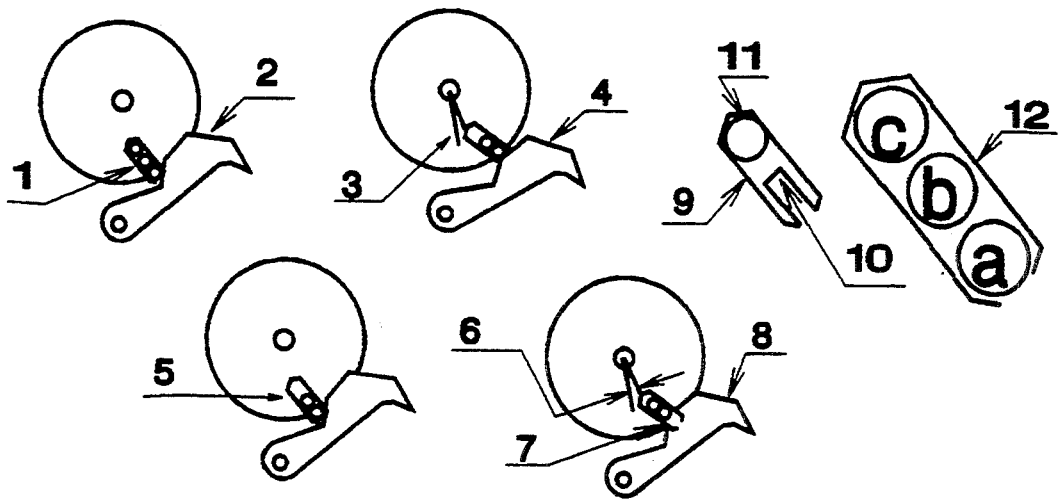
Figure 14:
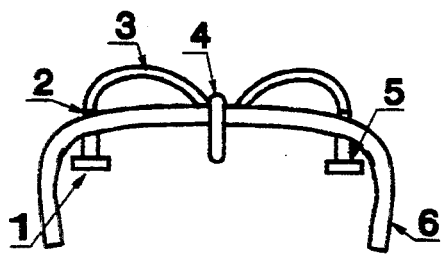
Figure 15:
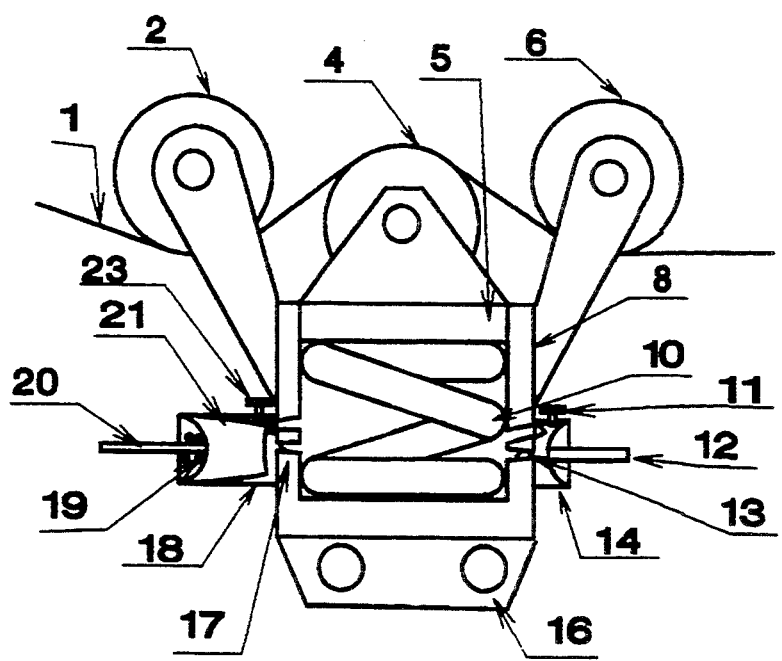
Figure 16:
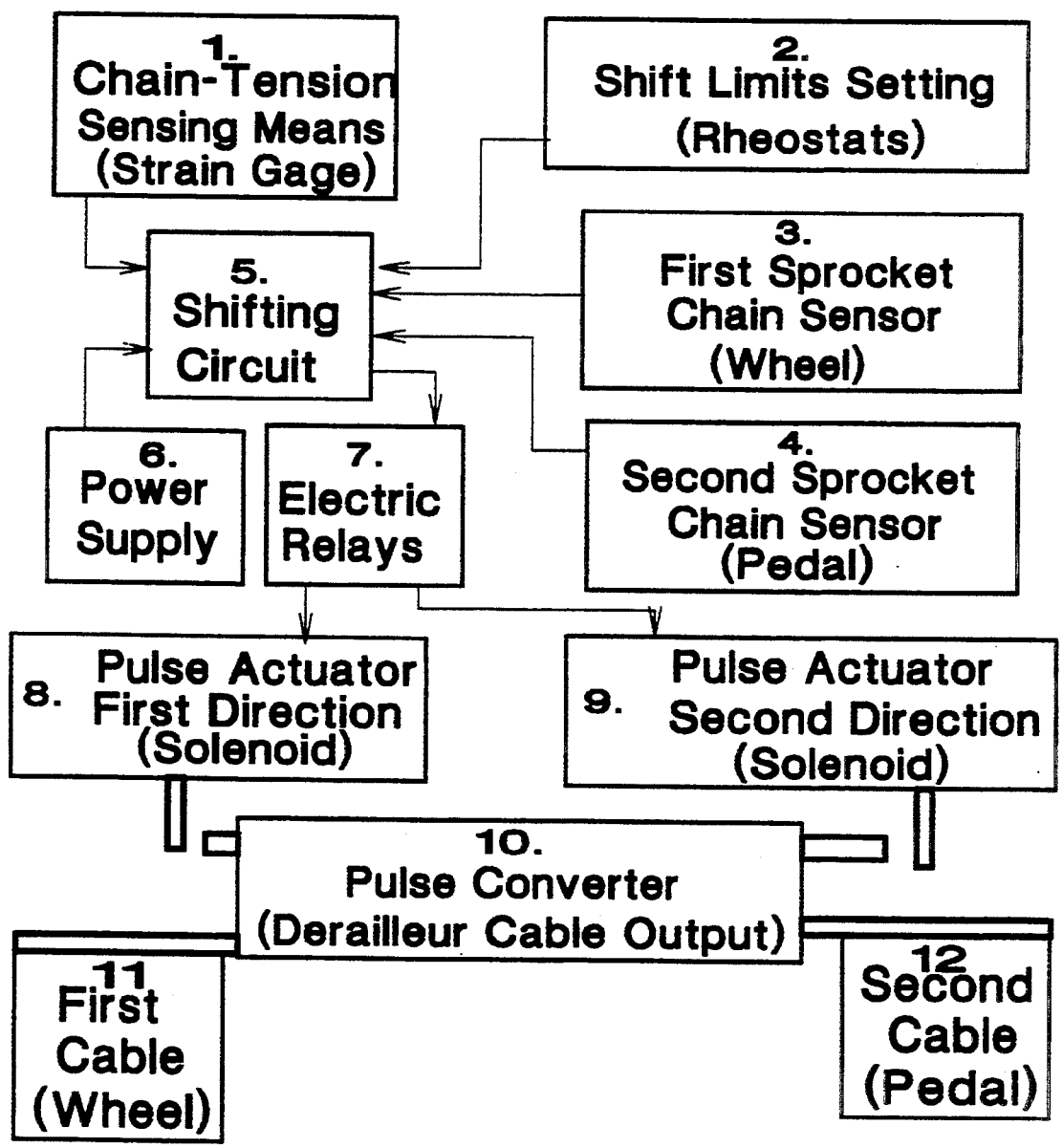
Figure 17:
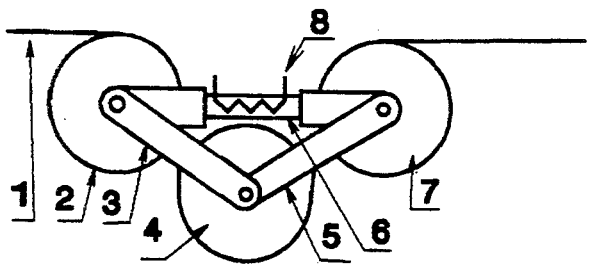
Figure 18:
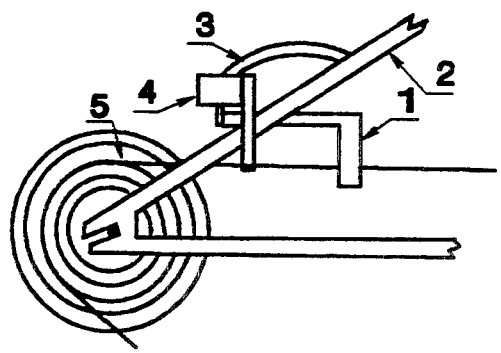
Figure 19:
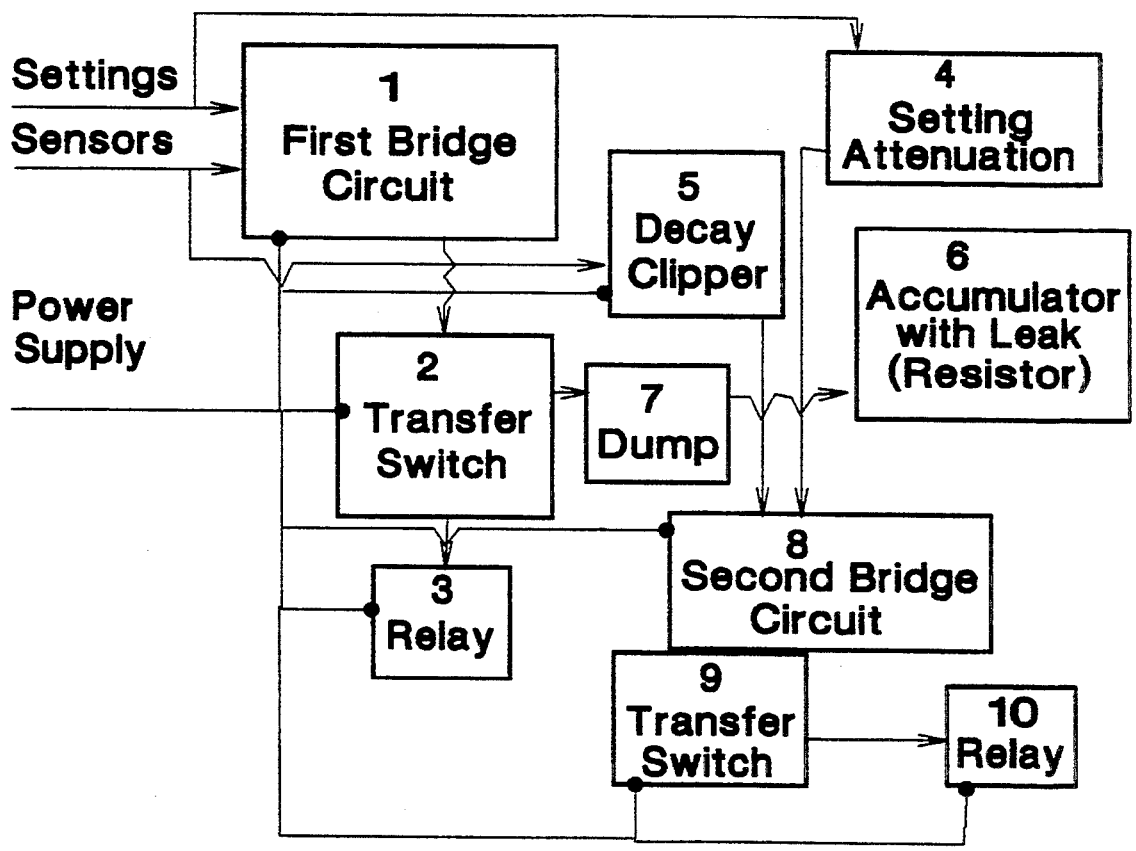
Figure 20:
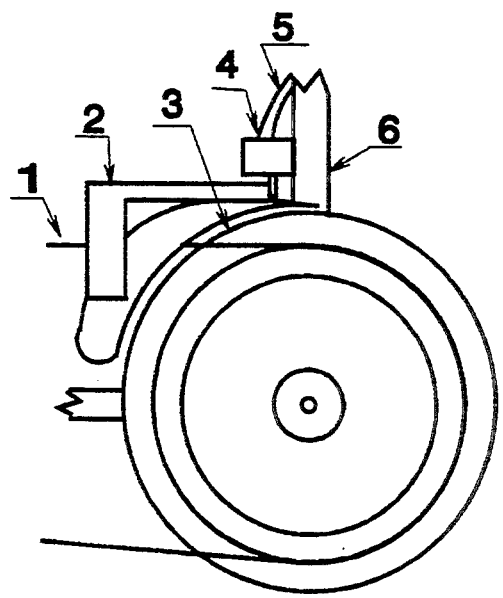

Push pulses use a side-cam (FIG. 10-1) of the carrier to press a ball (FIG. 10-3) into forward driving ratchet cavities (FIG. 11-13). Repeated pulses move the ratchet and its ratchet arm (FIG. 11-15) in relation to a sliding case arm (FIG. 11-16), and in combination move a derailleur cable (FIG. 11-17) for rear wheel through its full travel.

Similarly, pull pulses drive ball (FIGS. 10-3 & 11-4) into a rearward-driving ratchet cavity (FIG. 11-14) to move the cable in an opposite travel.

A sequence of pulses that exceeds cable travel of a first derailleur will close a second sliding case arm (FIG. 11-12) toward an outer case arm (FIG. 11-10) to drive a second derailleur cable (FIG. 11-11) for shifting the front derailleur apparatus.

A forward-riding chain-idler wheel (FIGS. 3-13 & 5-8) on a lever arm, (FIGS. 3-11 & 5-10) exerts spring (FIG. 5-12) pressure against the chain, biasing the arm with the tilt plate. This spring bias compensates shifting pressure from smaller sprockets (FIG. 2-23) of the pedal driven set).

Prior to an intentional stop, a rider may "shift down" chain (FIG. 3-19) onto larger wheel sprocket (FIG. 2-33) by reversing rotation of pedal (FIG. 2-21).

Chain travel (reversed) toward the rear sprocket engages a pawl (FIG. 12-4) from a chain positioner sprocket to extend into and rotate a pulser crank (FIGS. 12-8 & 12-26). Its spring-biased resistance (FIG. 12-11) member extends into, and rotates a large-sprocket chain guide (FIG. 12-28) until an arm of the chain guide meets a stop (FIG. 12-18).

I claim:

1. A chain shifter comprising:
   A. a pedal-driven vehicle with frame, wheels, pedals, chain and sprockets, and
   B. a chain-tension measuring means, attached to the frame, and
   C. a push-pulse means, driven by peak chain-tension force to deliver a pulse in a first direction, and
   D. a pull-pulse means, driven by lower chain-tension force and to deliver a pulse in a second direction, and
   E. a pulse converter means, driven by pulses in a first and second direction, and delivering linear movement of two directions into a derailleur cable, and
   F. a first derailleur apparatus, and
   G. a set of multiple, parallel, common-center sprockets;

wherein the chain-tension measuring means transmits a push-pulse in a first direction when peak chain-force exceeds a set measure; and,
   wherein the chain-tension measuring means transmits a pull-pulse in a second direction when chain-force is greater than a minimum force, and is less than the set measure; and
   wherein pulses move a derailleur input cable inwardly (or outwardly) to bridge sprockets on the set serviced by the first derailleur apparatus, and
   wherein a pulse is a (1) force, sufficient to actuate shifter and derailleur mechanisms, over a (2) distance to shift a derailleur guided chain between two adjacent sprockets.

2. A chain shifter of claim 1 wherein structures and mechanisms are of mechanical means.

3. A chain shifter of claim 2, further comprising:
   A. a person-driven chain drive, of Pedals, a sprocket, driven by pedals; a chain, driven by the pedal-sprocket; a first-sprocket set, driven by the chain; a derailleur apparatus, aligning the chain; and adjusted by movement of a cable; a rear wheel, driven by the first sprocket set and mounted in the vehicle frame; and,
   B. a chain tension measuring means, further comprised of a mechanical adjustment means, connecting the frame to a force-biasing means, connected to a chain-tension sensing means; and
   C. a push-pulse means, further comprising:
      1. a tilting arm means, with extension to
      2. a push fork, rotatably connected to
      3. a push block, held in rotational contact by
      4. a pulse-cable means; with the push block oriented to a first direction; and
   D. a pull pulse means, further comprising;
      1. a cam-pusher means further comprising: roller elements, in roller-element cycling means, driven by variation in angular motion from chain tension, and a roller column means, interfacing with
      2. a pull cam means, further comprising; a rotatable cam and surface, extending outwardly into a cable-pull fork, rotatably connected to a pull block, held in rotational contact position by the pulse-cable means, with the pull block oriented to a second direction; and
   E. a pulse converter means, driven by pulses in a first and second direction, and delivering linear movement of two directions into a derailleur cable;

wherein the chain-tension driven tilting arm reacts against the spring to rotate the push fork of the tilt plate and to push a cable-block one pulse-distance in a first direction; and
   wherein roller elements cycle within apparatus paths that are opened in response to chain tension that is less than peak, and greater than a minimum, and on accumulating multiple rollers in a slitted column to press rotationally against the cam whose cable-pull fork depresses and pulls the cable-block one pulse-distance in a second direction; and wherein pulses of the cable-blocks move a pulse cable that drives the pulse converter to move a derailleur input cable to shift the chain across a set of rear wheel sprockets.

4. A chain shifter of claim 3, wherein a tilting arm means comprises:

a spring biasing medium, adjustably connected to a base plate; and coiled around a shaft, passing through a bearing in the base plate, and affixed to a tilt plate, on which are mounted a fork, and a first idle sprocket, and a second idle sprocket, connected to a frame;

wherein the chain passes from a rear sprocket, around the first idle sprocket and oppositely around the second idle sprocket;

wherein a distance between the first idle sprocket's shaft and the tilt plate's shaft becomes a couple to induce a torque proportional to chain-tension, that rotates the tilt plate against tension of the spring;

wherein force on one pedal is transferred as tension on the chain, and proportionally represented as torque on the couple in a magnitude to overcome the spring's resistance, and to rotate the fork one pulse distance.

5. A chain shifter of claim 3, wherein a pulse cable means comprises:

a cable, cable guide(s), a push block, connected to the cable; a pull block, connected to the cable; and an end block, connected to cable;

wherein the cable guides are mounted on the base plate (FIG. 4-22) to locate the push block in a path of the tilting couple fork and to locate the pull block in a path of the rocker-cam fork), and wherein rotational movement of the fork beyond the set spring tension will move the cable one pulse distance in a first direction.

6. A chain shifter of claim 3, wherein a cam-pusher means further comprises:

1. a ball core, rotationally attached to the tilting arm means, and embodying a ball-holding slitted column, and a ball basket, and
2. a base plate, with bearing for the ball core, and holding a first ball-channel, of fixed location, and a second ball-channel; and
3. balls; and wherein each ball journeys from a tilted top exit of the ball column into a first channel, is captured by a rotating basket and held until the ball core rotation position opens to a second channel, and thence into the slitted column to be aligned with other balls and to act as a cam driver.

7. A chain shifter of claim 3, wherein a pull cam means comprises:

a rocker cam, rotationally attached at a first end to the base plate, and a pull-fork, extended from the rocker cam to surround one end of the pulse cable;

wherein, with the ball core rotating into position 8-4, and with an accumulation of balls to fill the ball column, continued rotation will guide cam surface into a slit at the bottom of the ball cam, and the column of balls will depress the pull cam to move a pull block one pulse distance in a second direction.

8. A pulse converter means comprising:
a. a ball,
b. a ball-carrier with cams,
c. a ratchet piece
d. a ratchet- arm
e. a derailleur cable
f. a pulse cable end
g. a first case and
h. a first case arm;

wherein push movements, communicated by a cable, move the ball and carrier first cam to depress a center-free ball into a forward-ratchet depression, and move the ratchet forward one unit; and similarly, pull movements move the a depress the center ball into a rear-ratchet depression, and move the ratchet backward one unit; and a primary derailleur cable is moved to distance between the ratchet arm and the first case arm.

9. A pulse converter means of claim 8 wherein the double ratchet piece and ratchet arm are replaced by a wire, wound to a parallel helix coil, and one end extends outwardly to be named a ratchet arm, 10. A chain shifter of claim 1, further comprising
A. a second derailleur apparatus, including a derailleur cable,
B. a second (pedal-driven) sprocket set, and
C. a second portion of the pulse converter means;

wherein the second portion of the pulse converter delivers linear movement of a first and second direction into a second derailleur cable when directional movement capacity for the first cable has been consumed;

wherein the pulse converter means, driven by pulses in a first and second direction, delivers linear movement of two directions into a derailleur apparatus attached to a wheel, and delivers linear movement of two directions into a derailleur apparatus attached to a pedal-driven sprocket.

11. A chain shifter of claim 10 wherein, the second portion of a pulse converter means further comprises:
a. an outer case
b. a bias spring
c. an outer case handle
d. a ratchet case second handle
e. a pedal-driven sprocket set, and
f. a second derailleur with cable apparatus;

wherein pulse movement in one direction that exceed travel of a rear derailleur apparatus are stopped by a maximum travel limit at the primary cable; and further pulse movement is transmitted to a second derailleur apparatus to shift chain travel on a second (pedal driven) sprocket set.

12. A pulse converter means of claim 8, further comprising a second portion of the pulse converter means comprising:
a. an outer case
b. a bias spring
c. an outer case handle, and
d. a ratchet case second handle wherein pulse movement in one direction that exceed travel of a rear derailleur apparatus are stopped by a maximum travel limit at the primary cable; and further pulse movement is transmitted to a second derailleur apparatus to shift chain travel on a second (pedal driven) sprocket set;

wherein the pulse converter means, driven by pulses in a first and second direction, delivers linear movement of two directions into a derailleur apparatus attached to a wheel, and delivers linear movement of two directions into a derailleur apparatus attached to a pedal-driven sprocket.

13. A chain shifter of claim 4, further comprising:

a chain-idler wheel, held by a forward lever arm, rotatably connected to the tilt plate at common shaft by an extended spring;

wherein the chain idler wheel rides the chain, and the spring adds torque to the tilt rotation apparatus in response to smaller and larger diameter sprockets over which the pedal-driven chain travels.

14. A chain shifter of claim 1 wherein structures and controlling mechanisms are a combination of mechanical and fluid means, 15. A chain shifter of claim 14, wherein
  A. the chain-tension measuring means further comprises:
    a mechanical chain-displacement apparatus, biased by an elastic medium, and driving an actuating piston, against a working fluid, stored in a fluid chamber, attached to the frame, and connected by fluid passages, to actuating devices, and
  B. the push pulse means is comprised of
    a fluid push-pulse apparatus of a chamber, mounted to move a pulse shaft in a first direction into a pulse-converter means, and
    a fluid-driven piston, and
    an input valve, with variable pressure setting apparatus, and
an output check valve, and
  C. the pull pulse means is comprised of
    a fluid pull-pulse apparatus of a chamber, mounted to move a pulse shaft in a second direction into a pulse-converter means, with volume to accept more than 1 hydraulic pulses, and
    a fluid driven piston, and
    a gas bag, within the chamber, and
    an input valve with apparatus to retain proportional lower pressure setting, and
    an output orifice with one-way valve;
wherein the chain is routed around a spring biased idler sprocket, and is reformed toward straightness by chain-tension forces, and
wherein the actuating piston transmits force to the working fluid of the chamber to flow it into the fluid push-pulse apparatus at a settable shift pressure, and will transmit a mechanical pulse in a first direction before returning the working fluid through a one-way orifice at a lower system pressure; and
wherein the working fluid is driven into the fluid pull-pulse means at a lower pressure, and accumulates volume to move the piston through multiple pulse strokes, while a small return flow continues through an orifice under the pressure of the gas bag, but with accumulated fluid, a peak pulse overcomes the internal bias to drive the piston in a second direction, and
wherein pulse actuators in a first and a second direction will provide input to the pulse converter.

16. A chain shifter of claim 1 wherein structures and controls are of mechanical and electro-mechanical means.

17. A chain shifter of claim 16, further comprising:
  A. a chain-tension sensing means, measured in peak patterns of electric resistance, and
  B. derailleur position sensors; and, measured in ohms, and
  C. a vehicle electric power supply, and
  D. a pedal force limit-setting rheostat, and
  E. a shifting circuit, with output to
  F. electric relays, and
  G. wiring, for sensing and actuating circuits, and
  H. pulse actuator for first direction, and
  I. pulse actuator for second direction, and
  J. a pulse converter means, driven by pulses in a first and second direction, and delivering linear movement of two directions into a derailleur cable;
wherein variation in chain tension is measured in terms of electric resistance, and is electrically compared to selected range of cyclic peak pedal pressure, and
wherein selected peak pedal pressure is moderated to add or subtract the resistance from the sensed position of pedal derailleur; and
wherein the sensing circuit actuates a push pulse with each peak pedal pressure that exceeds the setting; and
  wherein the sensing circuit actuates a pull pulse after a settable number of resistance peak measures per 10 pedal revolutions, whose resistance profile criteria is that their peak is less than the peak value set for a push pulse, and greater than a minimum threshold of peak pedal force, and
wherein pulses actuators in a first and a second direction will provide input to the pulse converter.

18. A shift-down chain guide comprising:
  A. an idle sprocket with
  B. a one-way rotary pawl, extended into
  C. a pulser crank, having in its first cup an internal ratchet to receive motion, and between its cups, a crankshaft, driving a pulser cable, and in its second cup,
  D. a friction arm, extended into
  E. a chain positioner wheel with a bent arm whose upward travel is limited by
  F. a stop post;
wherein reversed pedal motion engages the pawl to rotate a pulser crank, which provides "push" pulses to a common input to a pulse converter whose derailleur cable movement directs the derailleur chain-guide into an appropriate starting locations, and
wherein the friction arm into the chain positioner wheel conveys torque to lift the chain with the chain positioner arm and reversely mount the chain on a larger diameter sprocket of the rear wheel sprocket set.

19. A chain shifter of claim 10, further comprising
  a push-pull exchange block, further comprising
    an input-cable bar with cable-core connections, and
    input-cable guides with cable-guide connections;
wherein the exchange block is mounted with the cable to couple a pulser cable core of a shift down chain guide to a pulse converter means.

20. A chain shifter of claim 19, further comprising
  a thumb pulser apparatus, located on a vehicle steering handle, and connected by cable to the input cable bar;
wherein the orientation between the input cable bar and its input cable guide at a first position will permit a thumb pulse apparatus to perform a push impulse which "shifts down" within a sprocket set; and
wherein the orientation between the input cable bar and its input cable guide at a second position will permit a thumb pulse apparatus to perform a pull impulse which "shifts up" within a sprocket set.

* * * * *